US008646610B2

(12) United States Patent
Foght

(10) Patent No.: US 8,646,610 B2
(45) Date of Patent: Feb. 11, 2014

(54) PERSONALIZED COVER FOR ELECTRONIC DEVICES

(76) Inventor: Jamieson Foght, Waunakee, WI (US)

(*) Notice: Subject to any disclaimer, the term of this patent is extended or adjusted under 35 U.S.C. 154(b) by 224 days.

(21) Appl. No.: 13/333,612

(22) Filed: Dec. 21, 2011

(65) Prior Publication Data

US 2012/0159774 A1  Jun. 28, 2012

Related U.S. Application Data

(60) Provisional application No. 61/425,825, filed on Dec. 22, 2010.

(51) Int. Cl.
*B65D 85/00* (2006.01)
(52) U.S. Cl.
USPC .............................. 206/576; 206/320; 206/457
(58) Field of Classification Search
USPC .................. 206/576, 320, 701, 722, 724, 457, 206/459.5, 575, 224
See application file for complete search history.

(56) References Cited

U.S. PATENT DOCUMENTS

| 7,775,355 B1* | 8/2010 | Hood ............................ 206/320 |
| 7,957,524 B2* | 6/2011 | Chipping ................. 379/428.01 |
| 8,505,718 B2* | 8/2013 | Griffin et al. ................. 206/320 |
| 2007/0021068 A1* | 1/2007 | Dewhurst ........................ 455/42 |
| 2007/0205118 A1* | 9/2007 | Westendorf et al. .......... 206/229 |
| 2007/0227923 A1* | 10/2007 | Kidakarn ..................... 206/320 |
| 2010/0270189 A1* | 10/2010 | Pedersen et al. ............. 206/320 |
| 2012/0074005 A1* | 3/2012 | Johnson et al. .............. 206/320 |

\* cited by examiner

*Primary Examiner* — Jacob K Ackun

(74) *Attorney, Agent, or Firm* — Joseph T. Leone, Esq.; Daniel A. Blasiole; DeWitt Ross & Stevens S.C.

(57) ABSTRACT

Kits, components, and methods for personalizing covers for electronic devices are provided. Device-specific cases are dimensioned and configured to releasably affix to specific devices and to define substrate spaces when affixed to the devices. Device-specific templates are provided with the cases. The templates aid in appropriately shaping user-desired image substrates to fit between the cases and the devices when the devices are affixed to the cases. The templates include specifically placed apertures so that any substrates generated therewith do not occlude or disrupt the functionality of any functional component on the devices when the substrates are interposed between the cases and devices. Instructions for using the templates to generate appropriately configured substrates for use with the cases and devices are included.

15 Claims, 5 Drawing Sheets

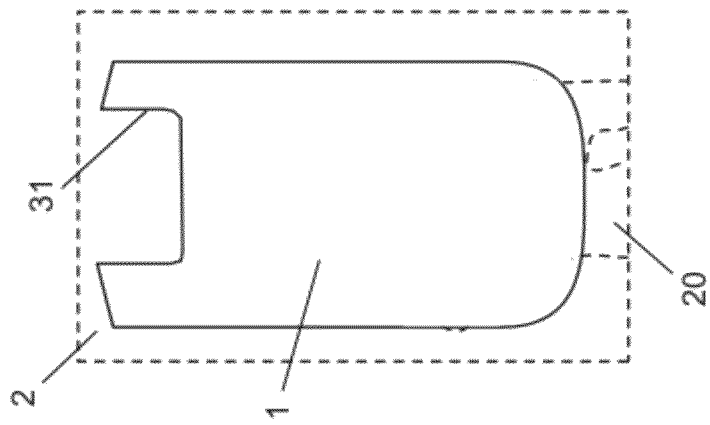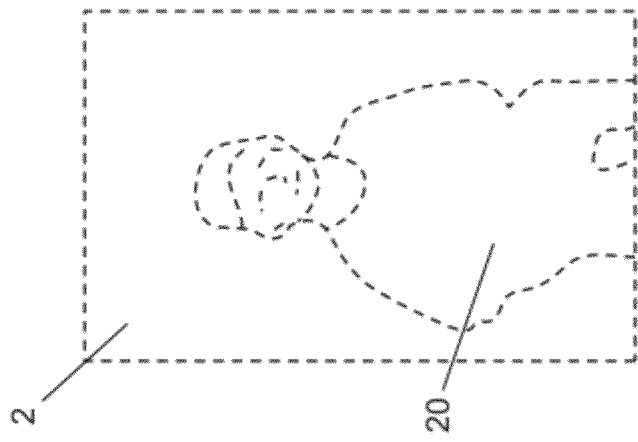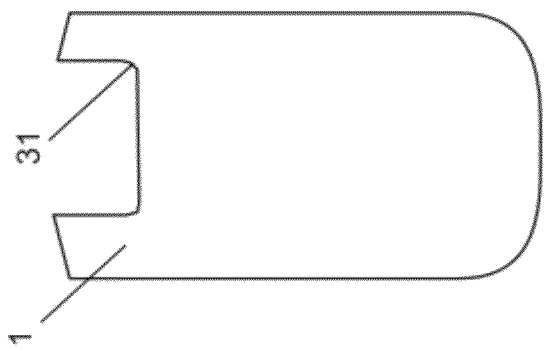

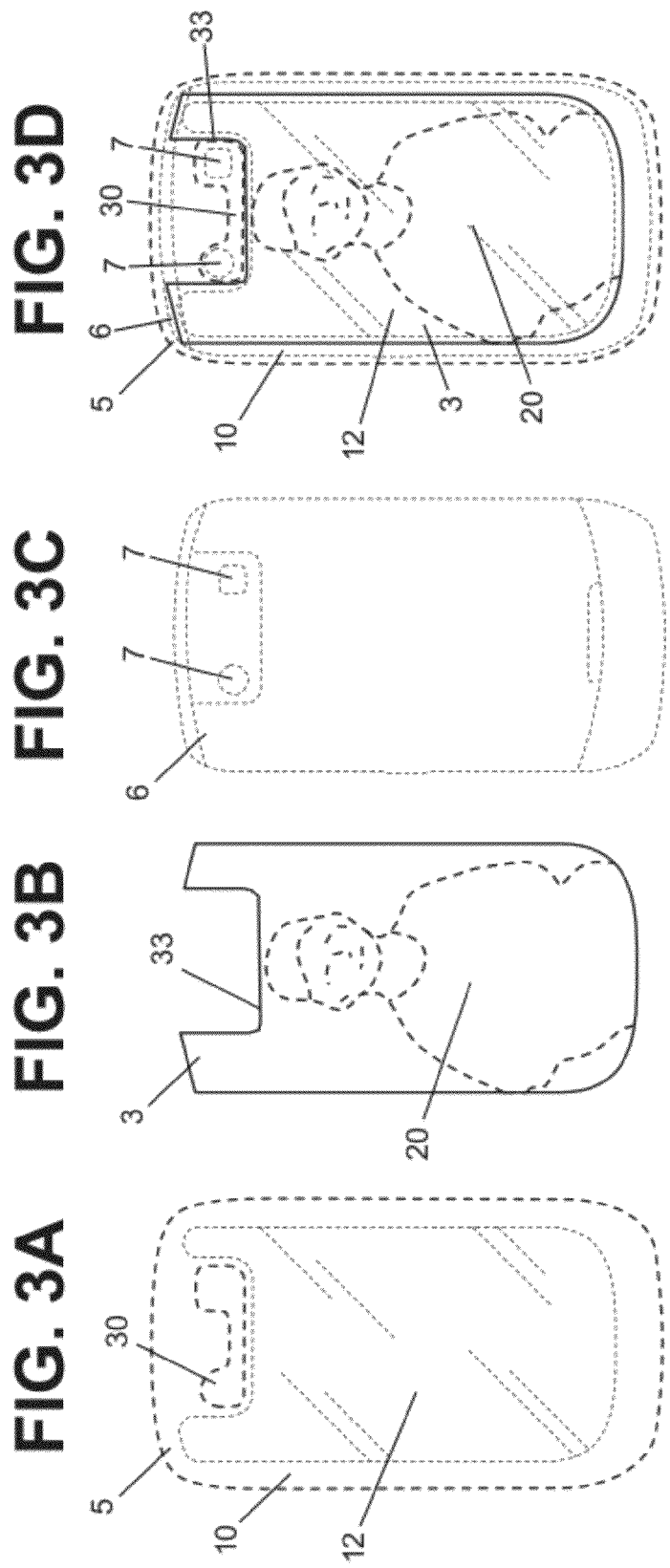

PERSONALIZED COVER FOR ELECTRONIC DEVICES

CROSS-REFERENCE TO RELATED APPLICATIONS

This application claims priority under 35 USC §119(e) to U.S. Provisional Patent Application 61/425,825 filed Dec. 22, 2010, the entirety of which is incorporated herein by reference.

FIELD OF THE INVENTION

The invention is directed to covers or cases for devices which are capable of being personalized with custom photos or images.

BACKGROUND

In the last decade, there has been an explosion of consumer electronics devices that are small, computationally powerful, expensive, designed to be carried on the person, yet are rather fragile and easily damaged. Foremost among these electronic devices are cell phones, personal texting devices, digital cameras, global positioning devices, electronic calendaring devices, and electronic devices combining two or more of these functionalities. While these devices are extremely useful, they are also extremely delicate and do not tolerate overly rough treatment. In addition to the electronics inside these devices, which are prone to failure when dropped, many of these devices also include a touch-sensitive glass or optically clear panel which is easily scratched or cracked.

Thus, there has sprung up an active trade in after-market cases and covers to protect these pricey, but easily damaged electronic devices. These cases and covers are often form-fitting, flexible plastic shells that provide some measure of overall physical protection to the overall structure of an electronic device. The cases and covers are, in essence, shock absorbers to soften the blow when the device is, for example, dropped on a hard surface or carried all day in a pocket full of loose change and a ring of keys. Some include a clear plastic overlay that protects the display portion of the device. These conventional cases and covers, however, are not easily personalized. Thus, the present invention is directed to kits, devices, and methods for personalizing covers for electronic devices.

SUMMARY OF THE INVENTION

One version of the present invention includes a kit for generating a personalized cover for an electronic device. The exemplary kit includes a device-specific case dimensioned and configured to releasably affix to a specific device and to define a substrate space having a profile shape when affixed to the device, wherein the case comprises a translucent or transparent window portion. The kit also includes a device-specific template dimensioned and configured to either define or be converted to define a profile shape substantially subsumable within the profile shape of the substrate space. The kit further includes instructions for using the template to generate a substrate space-shaped substrate from a non-substrate space-shaped substrate, wherein the substrate space-shaped substrate is capable of being stably interposed between the case and the device while having at least a portion the substrate space-shaped substrate visible through the window portion without occluding a functional component of the device when the case is affixed to the device.

In some versions of the invention, the template is configured such that the substrate space-shaped substrate generated therefrom does not occlude any functional component of the device when the case is affixed to the device.

In some versions of the invention, the template either defines or can be converted to define a profile shape substantially corresponding to a profile shape of the window portion. In other versions, the template either defines or can be converted to define a profile shape that extends beyond a profile shape of the window portion.

The window portion preferably comprises a window aperture at a position corresponding to a position of a functional component on the device when the case is affixed to the device. In addition, the template preferably comprises a template aperture at a position corresponding to the position of the functional component on the device.

In some versions of the invention, the template comprises a removable aperture flap at a position corresponding to the position of a corresponding functional component on the device. The aperture flap includes an image of the corresponding functional component. The aperture flap is preferably connected to a remaining portion of the template by perforations in the template.

In some versions of the invention, the template is provided in a first configuration in which the template is capable of being stably inserted in the case against the window portion when the case is not affixed to the device. The template in such a version may include at least one removable retention flap to retain the template in the case against the window portion when in the first configuration and when the case is not affixed to the device. Removing the retention flap converts the template to have the profile shape substantially corresponding to the profile shape of the substrate space. The retention flap may be connected to a remaining portion of the template by perforations in the template.

In the preferred version of the invention, the instructions are included on the template.

In some versions of the invention, the template comprises a front side and a back side, the front side depicts a stock image, and the back side depicts a small-scale representation of the front side of the template juxtaposed with a hypothetical substrate to indicate an orientation of the non-substrate space-shaped substrate with respect to the template in generating the substrate space-shaped substrate.

Some versions of the invention include at least one stock substrate having a stock image, wherein the stock substrate defines a profile shape substantially corresponding to the profile shape of the substrate space.

The objects and advantages of the invention will appear more fully from the following detailed description of the preferred embodiment of the invention made in conjunction with the accompanying drawings.

BRIEF DESCRIPTION OF THE DRAWINGS

FIG. 1A depicts a template according to the present invention.

FIG. 1B depicts a non-substrate space-shaped substrate with an image thereon.

FIG. 1C depicts the template superimposed on the non-substrate space-shaped substrate.

FIG. 3A depicts a device case according to the present invention.

FIG. 3B depicts a substrate space-shaped substrate.

FIG. 3C depicts an exemplary electronic device.

FIG. 3D depicts the case affixed to the device with the substrate space-shaped substrate interposed between the case and the device.

DETAILED DESCRIPTION OF THE INVENTION

Figure 2A:
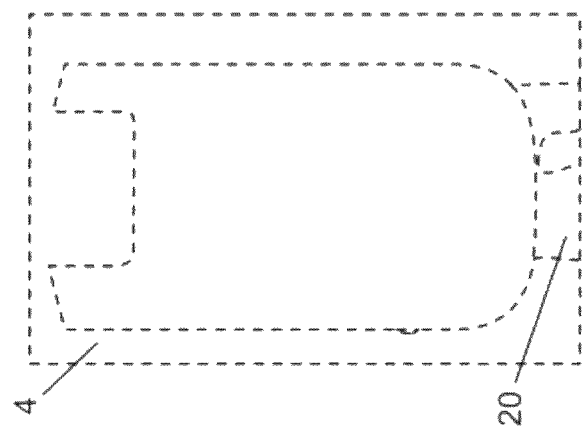
FIG. 2A depicts a substrate space-shaped substrate generated from the non-substrate space-shaped substrate with the template.

Referring to the drawings generally, where the same reference numerals are used throughout, the present invention comprises a device-specific template 1 and a device-specific case 5 to enable a user to customize the appearance of a device 6, such as an electronic device. The templates 1 and cases 5 of the present invention are configured or are capable of being configured to be compatible with the shape, size, and functionality of a particular device 6. Non-limiting examples of electronic devices with which the templates 1 and cases 5 are compatible include cell phones, texting devices, digital cameras, hand-held texting devices, notepad computers, tablet-style computers, and the like. The templates 1 and cases 5 may also be compatible with any non-electronic, substantially flat operational device whose length and width are generally longer than its depth. The term "device-specific" refers to a compatibility of a component with the shape, size, and functionality of a specific, given device 6, brand of device 6, or make and model of device 6. Non-limiting examples include the specific models of the various IPHONE-, IPAD-, and IPOD-brand devices (Apple, Cupertino, Calif.) and BLACKBERRY-brand devices (Waterloo, Ontario, Canada).

Figure 4B:
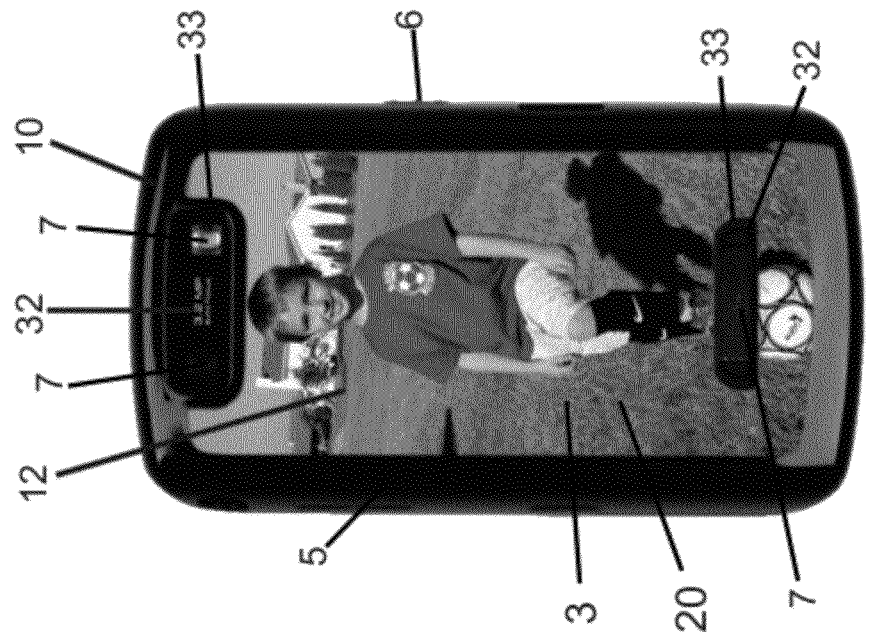
FIG. 4B depicts a case affixed to a device with a substrate space-shaped substrate interposed between the case and the device, wherein the case includes two window-portion apertures and the substrate space-shaped substrate comprises two substrate apertures.
Figure 4A:
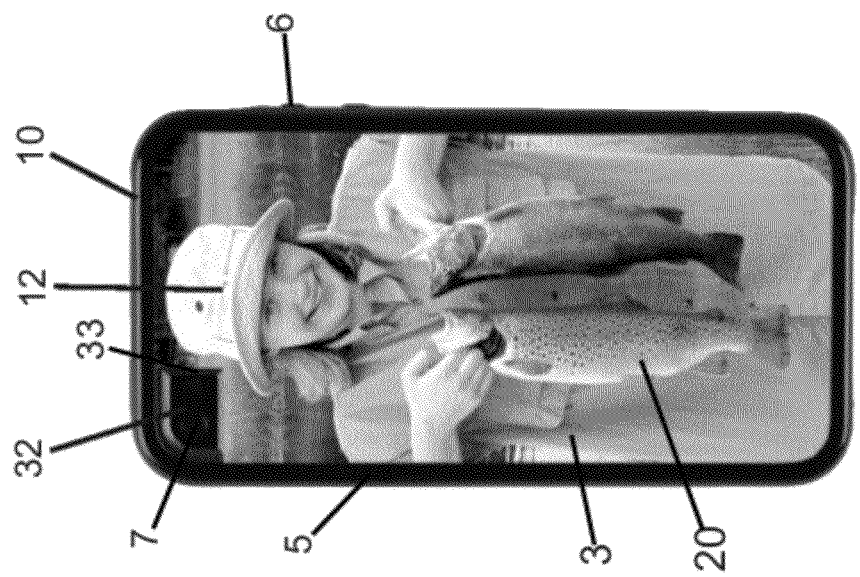
FIG. 4A depicts a case affixed to a device with a substrate space-shaped substrate interposed between the case and the device, wherein the case includes a window-portion aperture and the substrate space-shaped substrate comprises a substrate aperture.

The case 5 is dimensioned and configured to tightly, yet releasably, mate to the outer surface of the device 6 (as shown in FIGS. 3D, 4A, and 4B), particularly in a protective or decorative fashion. The case 5 comprises a transparent or translucent window portion 12. The window portion 12 exposes a substrate space-shaped substrate 3 interposed between the case and the device 6 when a substrate space-shaped substrate 3 is present, or exposes the device 6 itself when a substrate space-shaped substrate 3 is not present. The window portion 12 is preferably clear but may be tinted. The case preferably also comprises a frame portion 10. The frame portion 10 may also be transparent or translucent but is preferably is frosted or otherwise rendered opaque so that it hides the edges of a substrate space-shaped substrate 3 interposed between the case 5 and the device 6. If transparent or translucent, the frame portion 10 may be distinguished in some way from the window portion 12, either by tinting the frame portion 10 to contrast it from a clear window portion 12 or by tinting the frame portion 10 with a different color than that of the window portion 12.

The case 5 can be fabricated from any suitably flexible material. The preferred materials include natural rubber and/or synthetic rubber or plastics, which may include thermoplastic or thermosetting resins, such as thermoplastic polyurethane (TPU). The case 5 can be fabricated from a monolithic piece of polymeric material with the frame portion 10 being suitably dyed or otherwise colored, or it can be fabricated from two or more different materials. If the case 5 is fabricated from two different types of materials, it is preferred that the frame portion 10 be fabricated from a relatively flexible polymeric material so that the case 5 clings tightly, but removably, from the underlying device 6. Having the frame portion 10 made from a flexible and resilient material also has the added benefit that it protects the outer edges of the enclosed device from impact damage if the device 6 is dropped or jarred. Thermoplastic vinyl polymers and polyurethanes (including thermoplastic polyurethanes) are preferred. The window portion 12 is preferably fabricated from a stiffer, translucent or transparent material such a polycarbonate.

The window portion 12 of the case 5 defines a profile shape. As used herein with reference to the window portion 12, "profile shape" refers to the shape defined along the two most-extended axes of the window portion 12, i.e., the shape the window portion 12 as shown in FIGS. 3A, 3D, 4A, and 4B. The profile shape of the window portion 12 may span an entire front face of the case 5 or may span only a portion thereof.

The case 5 and device 6 preferably define a substrate space (not shown) between at least the window portion 12 of the case 5 and the device 6 when the case 5 is disposed about the device 6. The substrate space is a minimal space suitable for having a substrate, such as a piece of cardboard, paper, card stock, fabric (e.g., needlework), etc., stably and securely disposed therein. The substrate space defines a depth and a profile shape. The depth is the dimension spanning the distance between the window portion 12 and the device 6 when the case 5 is affixed to the device 6. The substrate space can define any depth, but preferably defines a depth substantially corresponding to—or slightly less than—the thickness of a standard photo, a piece of thin cardboard, a piece of paper, a piece of cardstock, or fabric (e.g., needlework). This ensures a compression fit of the substrate when situated in the substrate space. The profile shape of the substrate space is the space defined along a plane substantially parallel to the window portion 12, i.e., substantially perpendicular to the depth. In a preferred version, the profile shape of the substrate space substantially corresponds to or extends beyond the profile shape defined by the window portion 12. In some versions, the profile shape of the substrate space only extends slightly beyond the profile shape defined by the window portion 12. "Extends slightly beyond" in this context means extending no more than about 5 mm, about 4 mm, about 2.5 mm, about 1 mm, about 0.75 mm, about 0.5 mm, about 0.25 mm, about 0.1 mm, or about 0.05 mm beyond an outer perimeter defined by profile shape of the window portion 12. The profile shape of the substrate space may span an entire front face of the case 5 or may span only a portion thereof.

The case 5 may include one or more apertures to permit access to—and proper functioning of—various functional components 7 on the device 6 when the case 5 is affixed to the device 6. The apertures may include frame-portion apertures 30, which are present at least partially in the frame portion 10, and/or window-portion apertures 32, which are present at least partially in the window portion 12. As used herein, "functional component" refers to any component on a device that provides a particular function. Non-limiting examples include camera lenses, buttons, dials, styluses, storage tubes for styluses, etc.

The template 1 is dimensioned and configured to allow the user to configure a user-desired, non-substrate space-shaped substrate 2 into a substrate space-shaped substrate 3 so that the substrate can be reversibly interposed within the substrate space between the case 5 and the device 6 without interfering with the operation of the device 6. The template 1 is configured to either define or be converted to define a profile shape substantially subsumable within the profile shape of the substrate space. As used herein, "subsumable within" means that a first defined space does not extend beyond a second defined space. In some versions of the invention, the template 1 is configured to either define or be converted to define a profile shape substantially corresponding to the profile shape of the substrate space. Accordingly, the profile shape of the template 1 may substantially correspond to or extend beyond the profile shape defined by the window portion 12. The profile shape of the template 1 may alternatively extend slightly beyond the profile shape defined by the window portion 12. "Extend slightly beyond" in this context means extending no more than about 5 mm, about 4 mm, about 2.5 mm, about 1 mm, about 0.75 mm, about 0.5 mm, about 0.25 mm, about 0.1 mm, or about 0.05 mm beyond an outer perimeter defined by the profile shape of the window portion 12. Used with reference to the template 1, the non-substrate space-shaped substrate 2, or the substrate space-shaped substrate 3, "profile shape" refers to the shape defined along the two most-extended axes of the template 1, non-substrate space-shaped substrate 2, or the substrate space-shaped substrate 3, respectively, i.e., the shape the elements as shown in FIGS. 1A, 1B, and 2A.

The template 1 may be fabricated from any stiff or semi-stiff material, including (without limitation) clear plastic resins, colored or opaque plastic resins, paper, cardboard, Bristol board, and the like.

To facilitate generating substrates that do not interfere with the operation of the device 6, the template 1 preferably includes or can be adapted to include one or more template apertures 31 therein. Each template aperture 31 is preferably disposed on the template 1 at a position corresponding to a position of a functional component 7 on the device 6 when the case 5 is affixed to the device 6. In this manner, any substrate space-shaped substrate 3 prepared by the template 1 does not occlude the functional component 7 when interposed between the case 5 and the device 6 in the substrate space. The template 1 may be pre-configured to have the template aperture 31 contained therein. See, for example, FIG. 1A. In addition or alternatively, the template 1 may have a first configuration that is readily adaptable to have a template aperture 31 contained therein. An example of the latter is shown in FIGS. 5A and B, wherein the template 1 comprises a removable aperture flap 44. The aperture flap 44 preferably has defined boundaries such that its removal from the template 1 along the boundaries generates a template aperture 31 in a position corresponding to a functional component 7 on the device 6. The boundaries of the aperture flap 44 are preferably defined by perforations 46, along which the aperture flap 44 can be torn or cut from the remainder of the template 1. Alternatively or in addition, the aperture flap 44 may be demarcated by imprinted lines along which the aperture flap 44 may be cut. The aperture flap 44 may be disposed along the edge of the template 1, as shown in FIG. 5A, or wholly surrounded by remaining portions of the template 1, as shown in FIG. 4B. In a preferred version of the invention, the aperture flap 44 comprises an image 45 of its corresponding functional component 7. See, for example, the image of a camera lens on the aperture flap 44 in FIG. 5A.

Some versions of the template 1 include one or more removable retention flaps 42, as shown in FIGS. 5A and B. The retention flaps 42 can be folded perpendicularly with respect to the remainder of the template 1 to retain the template 1 in the case against the viewing window when the case 5 is not affixed to the device 6. The retention flaps 42 can be removed to convert the template 1 in a configuration in which the template 1 is capable of being interposed between the case 5 and the device 6 within the substrate space. The retention flaps 42 are preferably connected to the remainder of the template 1 via perforations 46 or are demarcated by lines to indicate where to separate the retention flaps 42 from the remainder of the template 1. With the retention flaps 42 and any aperture flaps 44 removed from the template 1, the template 1 is suitable for generating substrate space-shaped substrates 3. Depending on the depth of the template 1, the template itself may also serve as a substrate space-shaped substrate 3 suitable for fitting in the substrate space.

Instructions 50 for generating a suitably sized substrate with the template 1 of the present invention are preferably included with the case 5 and the template 1. The instructions 50 may provide directions comprising any or all of the steps for using the components as described herein. The instructions 50 may be in pictorial form or textual form. The instructions 50 may be included separately from the template 1 and case 5. In the exemplary version shown in FIG. 5B, the instructions 50 are included on a back side of the template 1. The exemplary instructions include: a first instruction 1' for converting a template 1 having retention flaps 42 and an aperture flap 44 into a template 1 having an appropriate profile shape for fitting in the substrate space; a second instruction 2' for correctly orienting the template 1 with respect to a non-substrate space-shaped substrate 2 having an image 20 so that at least a portion of the image 20 can ultimately be viewed through the window portion 12 without occluding a functional component 7 of the device 6; a third instruction 3' for tracing an outline of the profile shape on the non-substrate space-shaped substrate 2; a fourth instruction 4' for cutting the non-substrate space-shaped substrate 2 to generate a substrate space-shaped substrate 3 and a discarded portion; a fifth instruction 5' for placing the substrate space-shaped substrate 3 into the case 5 in a correct orientation for ultimately viewing the substrate space-shaped substrate 3 through the window portion 12 without occluding a functional component 7 of the device 6; and a sixth instruction 6' for affixing the case 5 to the device 6 in a correct orientation for viewing the substrate space-shaped substrate 3 through the window portion 12 without occluding a functional component 7 of the device 6. The template 1 may also include a separate instruction 7' for removing the retention flaps 42 from the template 1. The template 1 may still further include cutting instructions 8' for removing the retention flaps 42 and the aperture flaps 44 from the remainder of the template 1.

Figure 5B:
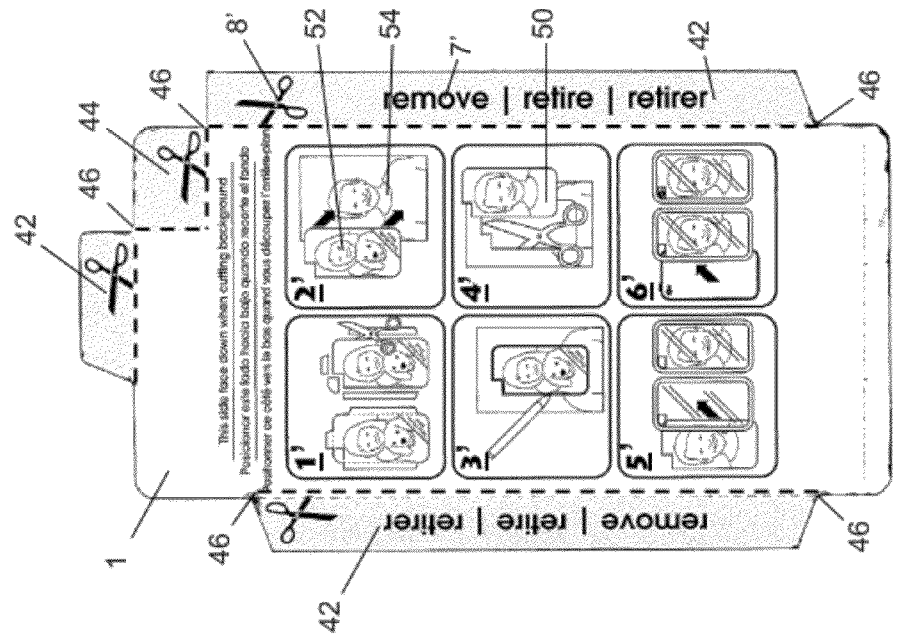
FIG. 5B depicts a back side of a template comprising retention flaps and an aperture flap.
Figure 5A:
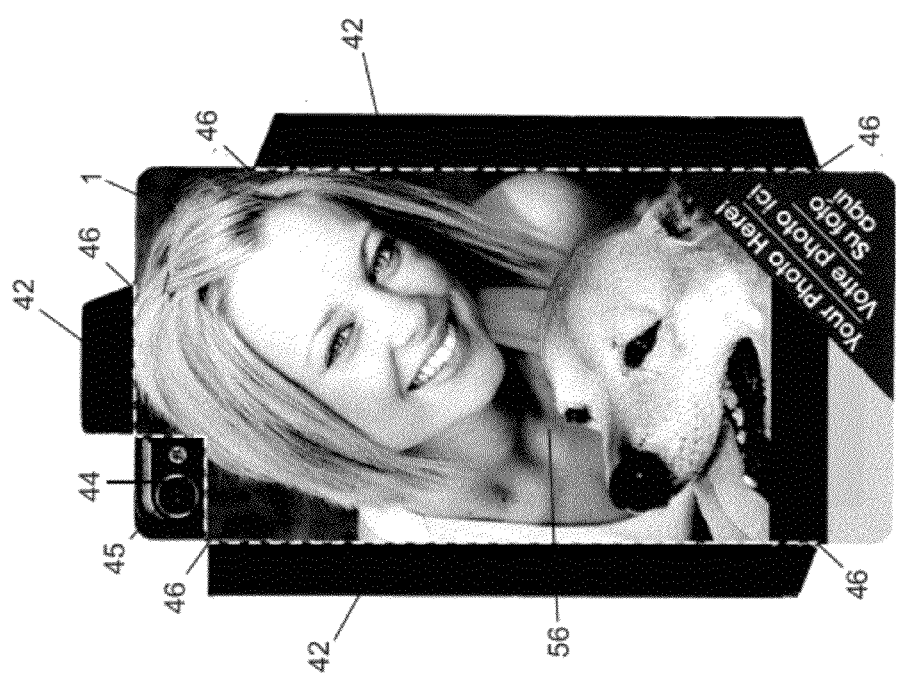
FIG. 5A depicts a front side of a template comprising retention flaps and an aperture flap.

In an exemplary version of the invention shown in FIGS. 5A and 5B, the template 1 comprises a front side (FIG. 5A) and a back side (FIG. 5B). The front side of the template 1 includes an image 56 on the non-retention flap and non-aperture flap portion of the template 1. The template 1 also includes an image 45 of a corresponding functional component 7, such as a camera lens, on the aperture flap 44. The template 1 in such a version may be provided with the case 5 with the template 1 inserted in the case 5 to mimic the ultimate placement of a substrate space-shaped substrate 3 within the case 5 and having a device 6 with functional components 7 affixed thereto. The back side, as shown in FIG. 5B, includes instructions 50 printed thereon. At least some of these instructions 50 (e.g., 2') include a small-scale representation 52 of the front side of the template with the image 56 thereon and a hypothetical substrate 54 having a user-desired image 20 thereon to show the correct orientation of the former with respect to the latter in shaping the substrate so that at least a portion of the image 20 can ultimately be viewed through the window portion 12 without occluding a functional component 7 of the device 6.

Some versions of the invention may further include one or more stock substrates having stock images in viewing through the window portion 12. The stock substrates are configured to either have or be adapted to have a profile shape substantially subsumable within or corresponding to the profile shape of the substrate space. The stock substrates may be included in addition to the template 1.

FIGS. 4A and 4B depict two different cases 5 affixed to two different devices 6 with configured substrates 3 disposed between the case 5 and the device 6. The two differently shaped devices 6 are depicted to show how the case 5 and underlying configured substrate 3 can be fabricated in any desired shape and can accommodate the functional components 7 of any particular device 6. The case 5 includes an opaque frame portion 10, and a transparent window portion 12. The image held in place by the case 5 is clearly visible through the window portion 12 of the case.

Figure 2B:
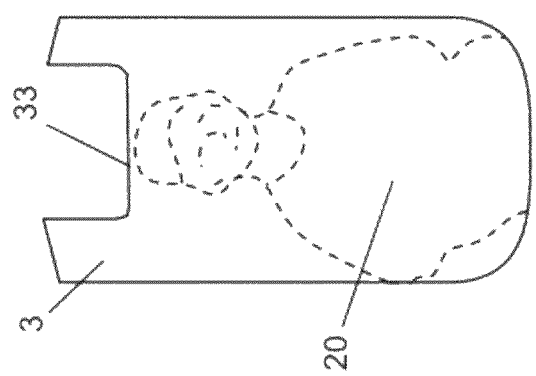
FIG. 2B depicts a discarded portion of the non-substrate space-shaped substrate.

In employing the invention described herein, a user determines a particular make and model of the device 7, as shown in FIG. 3C, for which he wants a case. The user obtains a device-specific template 1, as shown in FIGS. 1A and 1C, and a device-specific case 5, as shown in FIG. 3A. The template 1 may be pre-configured with one or more template apertures 31 or may have aperture flaps 44 for generating template apertures 31 on the template 1. The user selects a non-substrate space-shaped substrate 2, such as one comprising a user-desired image 20 thereon, as shown in FIG. 1B. An example of such a non-substrate space-shaped substrate 2 is a photograph. A template 1 defining a profile shape corresponding to the substrate space and including template apertures 31 is positioned on top of the non-substrate space-shaped substrate 2 and centered or otherwise positioned as desired by the user on the image 20 as shown in FIG. 1C. The non-substrate space-shaped substrate 2 is then cut according to the profile shape indicated by the template 1. This is performed by tracing the template 1 and cutting along the tracings or by directly cutting along the outer edges and template apertures 31 of the template 1. The cutting yields a substrate space-shaped substrate 3 having a profile shape corresponding to the substrate space, as shown in FIGS. 2A and 3B, and a discarded portion 4, as shown in FIG. 2B. The substrate space-shaped substrate 3 includes a substrate aperture 33 that corresponds both to the template aperture 31 as well as to the position of the functional component 7 on the device 6. The substrate space-shaped substrate 3 is then placed inside the case 5, and the case 5 is affixed to the outer surface of the device 6 as shown in FIGS. 3A-3D. The image 20 on the substrate space-shaped substrate 3 is visible through the window portion 12 of the case 5 and does not occlude or otherwise disrupt the functioning of any functional component 7 on the device 6. The result is a device 6 that is protected from rough treatment, and which is also personalized to reflect the unique nature of its owner.

The elements and method steps described herein can be used in any combination whether explicitly described or not. All combinations of method steps as described herein can be performed in any order, unless otherwise specified or clearly implied to the contrary by the context in which the referenced combination is made.

As used herein, the singular forms "a," "an," and "the" include plural referents unless the content clearly dictates otherwise.

The methods, devices, and kits of the present invention can comprise, consist of, or consist essentially of the elements and limitations described herein, as well as any additional or optional steps, components, or limitations described herein or otherwise useful in the art.

It is understood that the invention is not confined to the particular construction and arrangement of parts herein illustrated and described, but embraces such modified forms thereof as come within the scope of the following claims.

I claim:

1. A kit for generating a personalized cover for an electronic device comprising:
   a device-specific case dimensioned and configured to releasably affix to a specific device and to define a substrate space having a profile shape when affixed to the device, the case comprising a translucent or transparent window portion;
   a device-specific template dimensioned and configured to either define or be converted to define a profile shape substantially subsumable within the profile shape of the substrate space; and
   instructions for using the template to generate a substrate space-shaped substrate from a non-substrate space-shaped substrate, wherein the substrate space-shaped substrate is capable of being stably interposed between the case and the device while having at least a portion the substrate space-shaped substrate visible through the window portion without occluding a functional component of the device when the case is affixed to the device.

2. The kit of claim 1 wherein the template is configured such that the substrate space-shaped substrate generated therefrom is capable of being stably interposed between the case and the device while having at least a portion the substrate space-shaped substrate visible through the window portion without occluding any functional component of the device when the case is affixed to the device.

3. The kit of claim 1 wherein the template either defines or can be converted to define a profile shape substantially corresponding to a profile shape of the window portion.

4. The kit of claim 1 wherein the template either defines or can be converted to define a profile shape that extends beyond a profile shape of the window portion.

5. The kit of claim 1 wherein the window portion comprises a window aperture at a position corresponding to a position of a functional component on the device when the case is affixed to the device.

6. The kit of claim 1 wherein the template comprises a template aperture at a position corresponding to a position of a functional component on the device.

7. The kit of claim 1 wherein the template is provided in a first configuration in which the template is capable of being stably inserted in the case against the window portion when the case is not affixed to the device.

8. The kit of claim 7 wherein the template includes at least one removable retention flap to retain the template in the case against the window portion when in the first configuration and when the case is not affixed to the device, and wherein removing the retention flap converts the template to have the profile shape substantially corresponding to the profile shape of the substrate space.

9. The kit of claim 8 wherein the retention flap is connected to a remaining portion of the template by perforations in the template.

10. The kit of claim 1 wherein the template comprises a removable aperture flap.

11. The kit of claim 10 wherein the aperture flap includes an image of a corresponding functional component.

12. The kit of claim 10 wherein the aperture flap is connected to a remaining portion of the template by perforations in the template.

13. The kit of claim 1 wherein the instructions are included on the template.

14. The kit of claim 1 wherein the template comprises a front side and a back side, the front side depicts a stock image, and the back side depicts a small-scale representation of the front side of the template juxtaposed with a hypothetical substrate to indicate an orientation of the non-substrate space-shaped substrate with respect to the template in generating the substrate space-shaped substrate.

15. The kit of claim 1 further including at least one stock substrate having a stock image, wherein the stock substrate defines a profile shape substantially corresponding to the profile shape of the substrate space.

* * * * *